Sept. 16, 1930.                J. RAH                1,775,694
                    DISTRIBUTION BOX ARRANGEMENT
                        Filed July 10, 1925
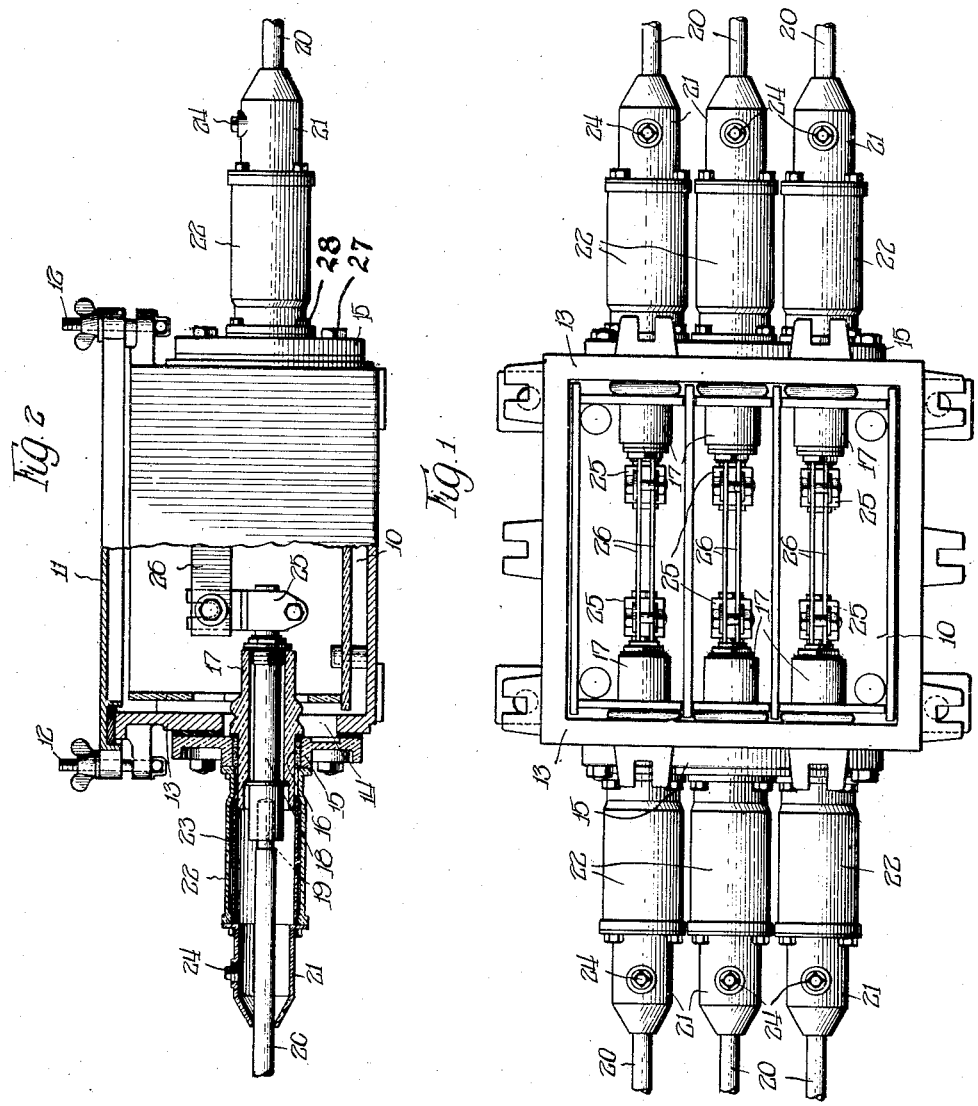
Witness:
P. Burkhardt
Inventor:
Joseph Rah,
By Wilkinson, Huxley, Byron & Knight
Attys.

Patented Sept. 16, 1930

1,775,694

UNITED STATES PATENT OFFICE

JOSEPH RAH, OF CHICAGO, ILLINOIS, ASSIGNOR TO G. & W. ELECTRIC SPECIALTY CO., OF CHICAGO, ILLINOIS, A CORPORATION OF ILLINOIS

DISTRIBUTION-BOX ARRANGEMENT

Application filed July 10, 1925. Serial No. 42,637.

This invention relates to a distribution box arrangement.

One object of the invention is to provide a simple and improved distribution box arrangement, whereby the plurality of electrical conductors extending into said box may be interchanged for changing the phase connections of the transformer and whereby a conductor may be easily disconnected and withdrawn to reduce the number of phases being used.

Another object of the invention is to provide a distribution box arrangement adapted to meet all of the commercial requirements.

These and other objects are accomplished by means of the arrangement disclosed on the accompanying sheet of drawings, in which—

Figure 1 is a front elevation of the distribution box arrangement, the cover of the box being removed; and Figure 2 is a side elevation of the same arrangement, some of the parts being shown in section.

The various novel features of the invention will be apparent from the following description and drawings and will be particularly pointed out in the appended claim.

Referring to the figures of the drawings, it will be noted that the invention is illustrated in connection with a distribution box arrangement in which a box 10 is provided, having a removable cover 11, which may be secured by any suitable fastening means as shown at 12. Each of two oppositely arranged sides 13 of the box has an opening 14, which normally is closed by a non-magnetic plate 15, bolted or otherwise secured to the box by a fastening means 27, each plate having three openings 16 for the reception of three associated porcelain tubes 17. In each of the porcelain tubes, there is secured and anchored in any suitable way, an electrical connector 18, one end of which is provided with a socket portion 19 for the reception of a cable conductor 20 by means of which the associated connector and conductor are electrically connected. Each conductor 20 extends through a wiping sleeve 21 and a brass or non-magnetic tube 22 to which the wiping sleeve is secured, which tube 22 is bolted or otherwise secured by fastening means 28. Preferably a bakelite tube 23 lines the tube 22 and a suitable insulating compound is passed into the wiping sleeve and tubes 22 and 23 for forming the proper seal, such compound being supplied by removing the plugs 24 in the wiping sleeve. Secured to the opposite end of each electrical connector 18 is a contact block 25, the upper end of aligned or associated contact blocks normally being connected by disconnecting links 26.

The conductors may be connected to the various phases of a transformer. Each of the conductors preferably is a single cable conductor, whereby it becomes easier to connect each of said conductors separately. Also where separate cable conductors are used, one or more may be withdrawn for operating fewer phases. This combination and arrangement of parts permits of a quick interchange in connections for interchanging the phase connections of a transformer. By removing the movable cover 11, the disconnecting links 26 may be quickly withdrawn for making it safe to repair a line. It will also be noticed that the tubes 22 carrying the individual cables are bolted to the plate 15 by means of the bolts 28, and the plate 15 which closes the openings in the box is bolted to said box by means of the bolts 27. This is an obvious advantage in that it is readily understood that the individual cables 20 may be disconnected, in which case their openings in the plate 15 may be closed by dummies, or other cables may be substituted in their place. This then will allow different phase connections or different outlet connections. The fact that the plate 15 is demountable makes it possible for any set of different phases to be used or any set of cable outlets to be used for it is an advantage in changing over from one generator to another, it being only necessary then to remove the plate 15 and substitute a similar plate in its place. These are only a few of the advantages of the demountable feature of the tubes and the plate, it being readily understood that other advantages will be apparent to those skilled in the art.

I claim:

In a device of the character described, the combination of a box, different sides of which have an opening, a demountable closure member for each of said openings, said members having a plurality of cables individually demountably associated therewith, each cable associated with an electrical connector, contact blocks associated with each connector, disconnecting links normally connected directly to associated contact blocks and supported thereby, and insulating means disposed between and completely separating different connections, said insulating means extending substantially uninterruptedly between said sides of said box.

Signed at Chicago, Illinois, this 30th day of June, 1925.

JOSEPH RAH.